US011341196B2

(12) United States Patent
Xu et al.

(10) Patent No.: US 11,341,196 B2
(45) Date of Patent: May 24, 2022

(54) HYBRID QUANTIZED DECISION MODEL FRAMEWORK

(71) Applicant: VMware, Inc., Palo Alto, CA (US)

(72) Inventors: Hui Xu, Palo Alto, CA (US); Jiajie Liang, Palo Alto, CA (US); Jong Ho Won, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/306,218

(22) Filed: May 3, 2021

(65) Prior Publication Data

US 2021/0312007 A1 Oct. 7, 2021

Related U.S. Application Data

(63) Continuation of application No. 16/837,379, filed on Apr. 1, 2020, now Pat. No. 11,017,050.

(51) Int. Cl.
| | |
|---|---|
| *G06F 16/953* | (2019.01) |
| *H04L 41/16* | (2022.01) |
| *H04L 43/0864* | (2022.01) |
| *H04L 67/101* | (2022.01) |
| *G06N 5/04* | (2006.01) |
| *H04L 67/12* | (2022.01) |
| *G06F 16/957* | (2019.01) |
| *G06N 3/08* | (2006.01) |
| *G06F 15/167* | (2006.01) |
| *G06N 20/00* | (2019.01) |
| *G06F 9/50* | (2006.01) |
| *G06N 3/04* | (2006.01) |

(52) U.S. Cl.
CPC ........ *G06F 16/953* (2019.01); *G06F 16/9574* (2019.01); *G06N 3/08* (2013.01); *G06N 5/047* (2013.01); *H04L 41/16* (2013.01); *H04L 43/0864* (2013.01); *H04L 67/101* (2013.01); *H04L 67/12* (2013.01); *G06F 9/505* (2013.01); *G06F 9/5027* (2013.01); *G06F 9/5083* (2013.01); *G06F 15/167* (2013.01); *G06N 3/0445* (2013.01); *G06N 3/0454* (2013.01); *G06N 20/00* (2019.01)

(58) Field of Classification Search
CPC .. G06F 16/953; G06F 16/5083; G06F 16/505; G06K 9/626; G06K 9/00973; G06K 9/6256

See application file for complete search history.

(56) References Cited

U.S. PATENT DOCUMENTS

| 10,261,938 B1 | 4/2019 | Jenkins et al. |
| 2020/0151619 A1 | 5/2020 | Mopur et al. |
| 2021/0174163 A1* | 6/2021 | Verma .................. G06F 16/953 |

* cited by examiner

*Primary Examiner* — Kyung H Shin
(74) *Attorney, Agent, or Firm* — Thomas Horstemeyer, LLP

(57) ABSTRACT

Various examples are disclosed for hybrid alert and action solution in IoT (IoT) networks. A cloud layer decision model that generates cloud layer predictions is identified using device layer data. A quantized decision model is generated as a quantized version of the cloud layer decision model. A logical group that includes an edge device that collects a portion of the device layer data is identified. The quantized decision model is transmitted to the logical group.

20 Claims, 4 Drawing Sheets

HYBRID QUANTIZED DECISION MODEL FRAMEWORK

CROSS-REFERENCE TO RELATED APPLICATIONS

This application is a continuation of, and claims priority to and the benefit of, U.S. application Ser. No. 16/837,379, filed on Apr. 1, 2020 and entitled "HYBRID QUANTIZED DECISION MODEL FRAMEWORK," which is incorporated herein by reference in its entirety.

BACKGROUND

The Internet-of-Things (IoT) refers to interrelated computing devices, sensors, and objects that are network-enabled such that they are periodically able to transfer data over a network. Machine learning models can take the place of user analyses and traditional methods of evaluating sensor data. However, performing predictions using machine learning can involve a high level of computing overhead to maintain a high level of confidence or accuracy. Typical data processing at the cloud layer can also involve significant levels of network overhead for data transmissions. Many IoT solutions evaluate data collected from end devices at a cloud server layer, where alerts are triggered, and actions are taken based on the data received from sensor devices.

There are many disadvantages for evaluating data and triggering actions at the cloud server layer. For instance, high and unpredictable latency may occur when evaluating data at the server. Additionally, network bandwidth demand is increased as all data and corresponding events, actions, and related data must be transmitted over a wide area network or the Internet. As a result, evaluating data at the cloud server layer can cause problems for usage cases which require low latency, low network bandwidth consumption, are time sensitive or have intermittent network connection.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
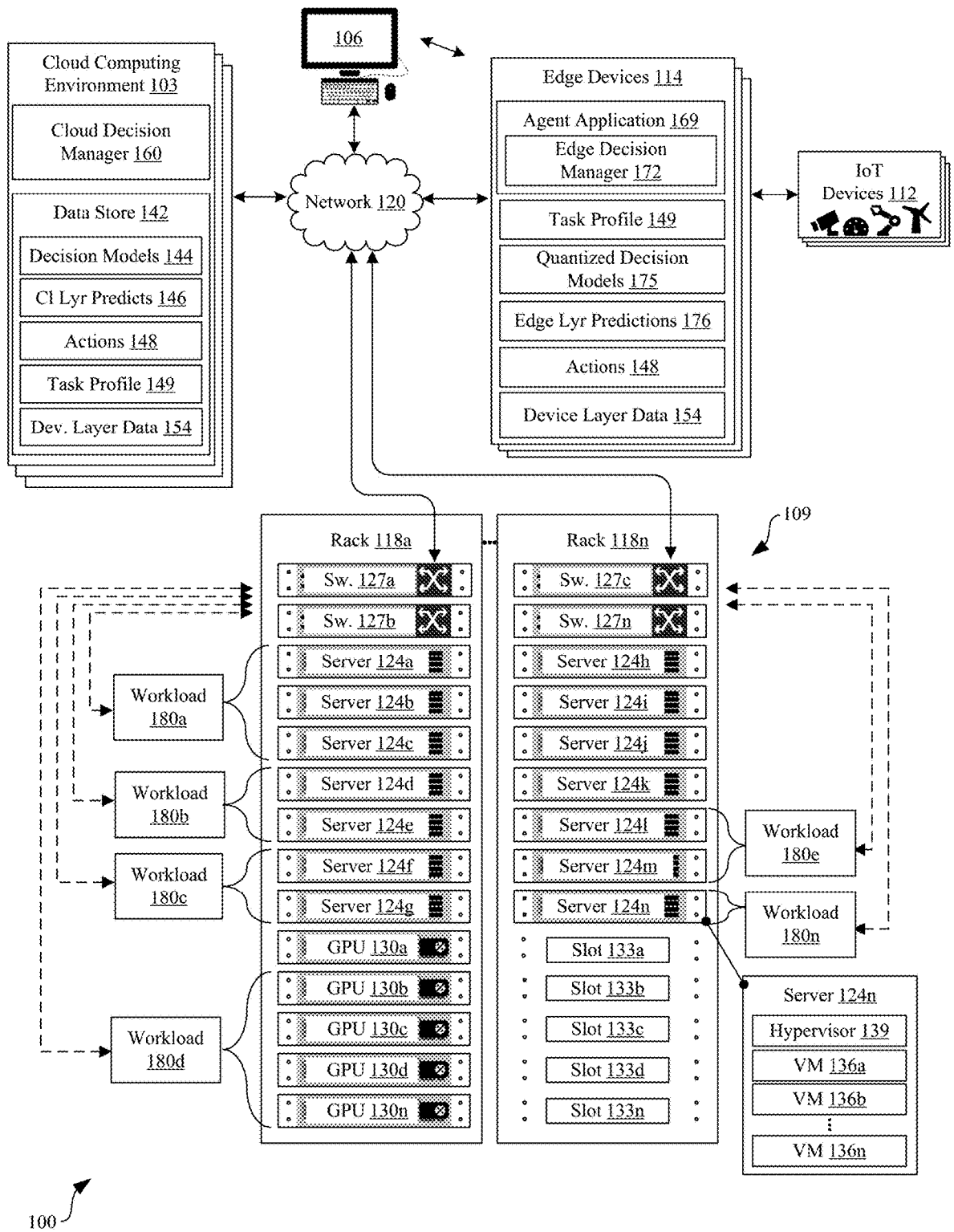
FIG. 1 is a drawing of an example of a networked computing environment for a hybrid quantized decision model framework.

The present disclosure relates to a hybrid quantized decision model framework. Processing device layer data for high confidence predictions can involve significant levels of memory and compute overhead. The cloud layer can be well suited for high confidence predictions. There are disadvantages for evaluating data and triggering actions at the cloud server layer. For instance, high and unpredictable latency may occur when evaluating data at the server. Additionally, network bandwidth demand is increased as all data and corresponding events, actions, and related data must be transmitted over a wide area network or the Internet. As a result, evaluating data at the cloud server layer can cause problems for use cases requiring low latency or low network bandwidth consumption, as well as those involving an intermittent network connection. In these cases, the edge layer can be appropriate, despite relatively limited compute and memory availability.

The present disclosure describes a hybrid quantized decision model framework that can intelligently balance responsibility for data evaluation between cloud and edge layer evaluation. The framework can offload some of the intelligent decisions powered by machine learning partially from the cloud layer to the edge layer, which is closer to the device layer of client devices and things, or Internet of Things (IoT) devices. In view of edge layer resource constraints, the decision models deployed at the edge can be optimized by quantization. Quantization results in an original or high-confidence decision model being reduced to a quantized decision model that has decreased memory and computational requirements, while also having decreased accuracy. A quantized decision model enables prediction decisions and actions to be performed at the edge layer if network connectivity is temporarily unavailable, or when a decision is time sensitive. If a high-confidence prediction decision is needed, edge layer prediction can act as a first phase analysis that triggers cloud layer prediction when a confidence probability of the edge layer prediction is low.

Delegation of decision-making to the edge layer device is non-trivial. While the high-confidence decision models used in the cloud layer can use high resolution inputs, multiple layers, a large memory footprint, and inference complexity. However, edge devices can be constrained by the hardware resources of the edge device, which can support lower resolution inputs, can include less than 1G memory, and can have limited power. Quantization can include techniques to compress decision models and optimize for edge model serving.

As a result, a quantized decision model can take a smaller input resolution, make faster predictions, include a smaller memory footprint, and can take fewer single-pass floating point operations per second (FLOPs) to save compute and electrical power. For example, a "Resnet" model deep learning model can be quantized from 178 MB to 45 MB, and inference latency from 3973 ms to 2868 ms while maintaining accuracy 0.770 to 0.768.

The example of a cargo truck carrying agricultural products can show the practical applicability of a hybrid quantized decision model framework for intermittent network connectivity. The internal refrigerator system can determine the optimal temperature for the transported agricultural products and make an adjustment decision depending on multiple inputs including the external temperature, agricultural product type, and freight internal temperature. When the truck is traveling, uplink network connectivity may be limited to intermediate stops, for example, where WiFi or other wireless LAN connectivity is provided. A quantized temperature adjustment decision model can be utilized in an edge device provided on the truck. The edge device can consult the cloud layer only when network connectivity is available.

The example of a building security system can show the applicability of a hybrid quantized decision model framework for reducing network bandwidth requirements. One feature of the security system can include human entrance detection. A camera can constantly take high resolution images to monitor an area for human entrance activity. Each high-resolution image can take megabytes of storage, and the camera can capture and provide, for example, 30 images per second for human entrance detection classification. However, most of the time, no human entrance activity will be detected. Making detection decisions in the cloud layer can consume gigabytes of network bandwidth per hour. A quantized human activity decision model can be utilized in an edge device. The edge device can make a prediction decision with a particular confidence probability. The edge device can consult the cloud layer if an edge layer prediction is made, and the edge layer prediction is associated with insufficient confidence probability.

Turning now to FIG. 1, an example of a networked environment 100 is shown. The networked environment 100 can include a cloud computing environment 103, client devices 106, various computing systems 109, and IoT devices 112 having one or more sensors, and edge devices 114 in communication with one another over a network 120. The network 120 can include, for example, the Internet, intranets, extranets, wide area networks (WANs), local area networks (LANs), wired networks, wireless networks, other suitable networks, or any combination of two or more such networks.

The network 120 of the networked environment 100 can include satellite networks, cable networks, Ethernet networks, telephony networks, and other types of networks. The computing systems 109 can include devices installed in racks 118a . . . 118n (collectively "racks 118"), which can make up a server bank, aggregate computing system, or a computer bank in a data center or other like facility. In some examples, the computing systems 109 can include high-availability computing systems, which include a group of computing devices that acts as a single system and provides a continuous uptime. The devices in the computing systems 109 can include any number of physical machines, virtual machines, virtual appliances, and software associated therewith, such as operating systems, drivers, hypervisors, scripts, and applications.

The computing systems 109, and the various hardware and software components contained therein, can include infrastructure of the networked environment 100 that provide one or more computing services. Computing services can include alert services or other application programming interface (API) services. For instance, the computing services can provide an applicant programming interface that permits an application or service to generate, store, retrieve, delete or otherwise interact with alerts. The alerts may be stored in a data store that can include memory accessible by one or more of a plurality of servers 124a . . . 124n (collectively "servers 124"). For instance, the data store can include one or more relational databases, such as structured query language databases, non-SQL databases, time-series databases, or other relational or non-relational databases.

The cloud computing environment 103 can include an enterprise computing environment that includes hundreds, or thousands of physical machines, virtual machines, and other software implemented in devices stored in racks 118, distributed geographically, and connected to one another through the network 120. As such, the cloud computing environment 103 can be referred to as a distributed computing environment in some examples. It is understood that any virtual machine or virtual appliance is implemented using at least one physical device, such as a server or other computing device.

The devices in the racks 118 can include various physical computing resources. The physical computing resources can include, for example, physical computing hardware, such as memory and storage devices, servers 124, switches 127a . . . 127n, graphics cards having one or more GPUs 130a . . . 130n installed thereon, central processing units (CPUs), power supplies, and similar devices. The devices, such as servers 124 and switches 127, can have dimensions suitable for quick installation in slots 133a . . . 133n on the racks 118.

In various examples, the servers 124 can include requisite physical hardware and software to create and manage virtualization infrastructure, a cloud computing environment, an on-premise environment, and/or a serverless computing environment. Also, in some examples, the physical computing resources can be used to provide virtual computing resources, such as virtual machines or other software, as a computing service.

Each server 124, such as representative server 124n, can act as a host in the networked environment 100, and thereby can include one or more virtual machines (VMs) 136a . . . 136n (collectively "virtual machines 136"). In some examples, a hypervisor 139 can be installed on a server 124 to support a virtual machine execution space within which one or more virtual machines 136 can be concurrently instantiated and executed. The hypervisor 139 can include the ESX™ hypervisor by VMware®, the ESXi™ hypervisor by VMware®, or similar hypervisor 139 in some examples. It is understood that the computing systems 109 can be scalable, meaning that the computing systems 109 in the networked environment 100 can increase or decrease dynamically to include or remove servers 124, switches 127, GPUs 130, power sources, and other components without downtime or otherwise impairing performance of the computing services offered up by the computing systems 109.

Referring now to the cloud computing environment 103, the cloud computing environment 103 can include, for example, a server 124 or any other system providing computing capability. Alternatively, the cloud computing environment 103 can include one or more computing devices that are arranged, for example, in one or more server banks, computer banks, computing clusters, or other arrangements. The cloud computing environment 103 can include a grid computing resource or any other distributed computing arrangement. The computing devices can be located in a single installation or can be distributed among many different geographical locations. The cloud computing environment 103 can include or be operated as one or more virtualized computer instances in some examples. Although shown separately from the computing systems 109, it is understood that in some examples the cloud computing environment 103 can be included as all of or a part of the computing systems 109.

For purposes of convenience, the cloud computing environment 103 is sometimes referred to herein in the singular. Even though the cloud computing environment 103 is referred to in the singular, it is understood that a plurality of cloud computing environments 103 can be employed in the various arrangements as described above. As the cloud computing environment 103 communicates with the computing systems 109 and client devices 106 over the network 120, sometimes remotely, the cloud computing environment 103 can be described as a remote cloud computing environment 103 in some examples. Additionally, in various examples, the cloud computing environment 103 can be implemented in servers 124 of a rack 118 and can manage operations of a virtualized or cloud computing environment through interaction with the computing services.

The cloud computing environment 103 can include a data store 142, which can include one or more databases in some examples. The data store 142 can include memory of the cloud computing environment 103, mass storage resources of the cloud computing environment 103, or any other storage resources on which data can be stored by the cloud computing environment 103. The data store 142 can include memory of the servers 124 in some examples. The data store 142 can include one or more relational databases, such as structured query language databases, non-SQL databases, or other relational or non-relational databases. The data stored in the data store 142, for example, can be associated with the operation of the various services or functional entities described below.

The data store 142 can include decision models 144, which can include or specify cloud layer predictions 146 and actions 148 based on device layer data 154 such as states and sensor readings from IoT devices 112 and client devices 106. The cloud decision manager 160 can analyze device layer data 154 to identify a cloud layer prediction 146. The cloud decision manager 160 can identify one or more predefined actions 148 to perform in response to the cloud layer prediction 146. In some cases, the cloud layer prediction 146 can be used as a key to identify associated actions 148. Decision models 144 can include machine learning models, deep learning models, statistical models, and other nondeterministic models. The decision models 144 can result in a cloud layer prediction 146 based on unstructured input data, such as image, audio, and video time series data. The cloud layer prediction 146 can also indicate or otherwise be associated with a confidence probability. Predictions 146 can include image classification, object recognition, path tracking, and other predictions that can be difficult to directly program with deterministic rules.

The components executed on the cloud computing environment 103 can include, for example, cloud decision manager 160, as well as other applications, services, processes, systems, engines, or functionality not discussed in detail herein. The cloud decision manager 160 can provide an administrator console having one or more interfaces to create, read, update, or delete decision models 144, cloud layer predictions 146, and associated actions 148. In some examples, the cloud decision manager 160 includes a data point evaluator that evaluates sensor data and triggers cloud layer predictions 146 if decision models 144 are satisfied based on the device layer data 154. Further, the cloud decision manager 160 can serve up one or more user interfaces that can be accessed by the client device 106 to read or acknowledge cloud layer predictions 146 and resulting actions 148.

The various physical and virtual components of the computing systems 109 can process workloads 180a . . . 180n. Workloads 180 can refer to the amount of processing that a server 124, switch 127, GPU 130, or other physical or virtual component has been instructed to process or route at a given time. The workloads 180 can be associated with virtual machines 136, public cloud services, private cloud services, hybrid cloud services, virtualization services, device management services, containers, or other software executing on the servers 124.

The IoT devices 112 can include "things" in an IoT network, such as objects or devices having one or more sensors thereon, such as a camera, temperature sensor, humidity sensor, microphone or audio sensor, presence sensor, or other sensors. To this end, the IoT devices 112 can include touch sensors; physical input devices such as keypads, buttons, and switches; cameras; physical actuators, such as locks; automotive sensors, such as fuel sensors, temperature sensors, engine sensors, and tire sensors; manufacturing sensors, such as assembly line sensors; and industrial sensors, such as windmill and solar panel sensors.

In some examples, IoT devices 112 do not include a wide area network interface, but can include hardware to communicate device layer data 154 measured by the one or more sensors to an edge device 114 located at or near the IoT devices 112. States such as actuator positions, online statuses, device settings, software errors, software versions, and other device layer data 154 can also be communicated to edge devices 114. IoT devices 112 can communicate data to edge devices 114 through connections that utilize Bluetooth®, Zigbee®, or other suitable protocols. The edge devices 114, in turn, can route the device layer data 154 to the cloud computing environment 103 provided, for example, by cloud- or Internet-based servers 124. As such, the edge devices 114 can be referred to as gateways as they include a networking module that permits remote communication over the Internet or other suitable network 120.

In some examples, an edge device 114 can include an agent application 169 that oversees operation of the edge device 114 as well as IoT devices 112 to which the edge device 114 is paired or assigned. For instance, assuming an IoT device 112 includes a smart lock that secures a door to a home or business using a keypad that requires entry of a predefined sequence of numbers to open. The IoT device 112 may not have the capability of communicating device layer data 154 directly to a server 124. As such, the IoT device 112 can collect successful or unsuccessful attempts to open the smart lock and send the data associated therewith to an edge device 114. The edge decision manager 172 of the edge device 114 can evaluate the successful or unsuccessful attempts in view of the quantized decision models 175 and the device layer data 154, or can forward the device layer data 154 to the cloud decision manager 160 for evaluation using the higher-confidence decision models 144.

A task profile 149 can include a profile of requirements for a quantized decision model 175, which applies to a logical group of edge devices 114. Task profiles 174 can include time-sensitive task profiles 174 and bandwidth-sensitive task profiles 174. All task profiles 174 can specify a unique quantized model identifier for a quantized decision model 175, a logical group of edge devices 114, and an edge layer decision threshold. The edge layer decision threshold can refer to a minimum prediction confidence in percentage to delegate decision-making to the edge device 114, such that the edge device 114 can utilize the quantized decision model 175 without consulting the cloud decision manager 160 and the higher-confidence version or decision model 144. A time-sensitive task profile 149 can also indicate a cloud consultation threshold time, which can be a maximum latency that the quantized decision model 175 can wait for a cloud layer prediction from the cloud decision manager 160. A time-sensitive task profile 149 can also indicate a cloud correction threshold time, which can be a maximum latency that the quantized decision model 175 can wait for a cloud layer prediction that indicates a correction of an edge layer prediction 176 in view of a cloud layer prediction 146. A bandwidth-sensitive task profile 149 can specify a unique quantized model identifier, a logical group of edge devices 114, and an edge layer decision threshold.

The edge device 114 can also maintain a network status hash table that includes two sub fields indicating accessibility of the cloud computing environment 103 or Internet, and a current edge-cloud round trip latency in seconds. The network status hash table can also be included in a task profile 149 or task that includes the task profile and a quantized decision model 175. In some cases, the agent application 169 can retrieve the quantized decision model 175 based on the unique identifier of the quantized decision model 175 included in a task profile 149.

Each quantized decision model 175 can correspond to a quantized version of a decision model 144. As a result, a quantized decision model 175 can take a smaller input resolution, make faster predictions, include a smaller memory footprint, and can take fewer single-pass floating point operations per second (FLOPs) to save compute and electrical power. The quantized decision model 175 can enable edge layer predictions 176 and actions 148 to be performed using the edge device 114 if network connectivity is temporarily unavailable, or when a decision is time sensitive. The edge decision manager 172 can analyze device layer data 154 using a quantized decision model 175 to identify an edge layer prediction 176. The edge decision manager 172 can identify one or more predefined actions 148 to perform in response to the edge layer prediction 176. In some cases, the edge layer prediction 176 can be used as a key to identify associated actions 148. Quantized decision models 175 can include quantized versions of the decision models 144 in the cloud computing environment.

Figure 2:
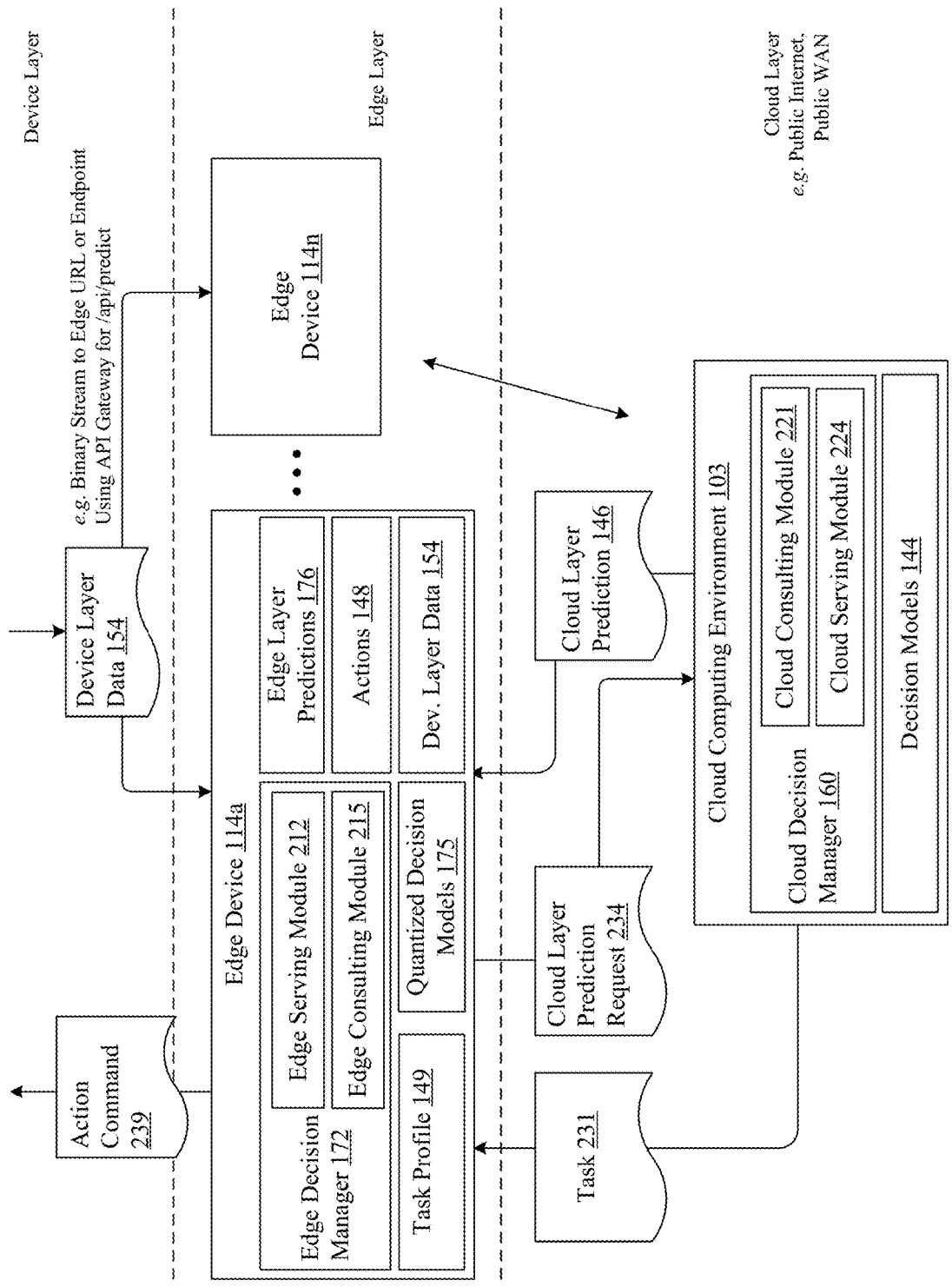
FIG. 2 is a schematic diagram illustrating communications for a hybrid quantized decision model framework.

Referring now to FIG. 2, illustrating communications for a hybrid quantized decision model framework. The framework can include devices and communications between a device layer, an edge layer, and a cloud layer. The device layer can include IoT devices 112 and client devices 106 that can connect through the edge devices 114 and transmit device layer data 154 to the edge devices 114. The device layer data 154 can be transmitted as a binary stream to an edge URL or endpoint using an API Gateway for /api/predict/ for predictions.

The edge layer can include any number of edge devices 114a . . . 114n. The edge device 114a can include the edge decision manager 172, task profiles 174, quantized decision models 175, edge layer predictions 176, actions 148, and device layer data 154 as also indicated in FIG. 1. The edge decision manager 172 can include an edge serving module 212 and an edge consulting module 215.

The edge serving module 212 can analyze the device layer data 154 to make an edge layer prediction 176 using a quantized decision model 175. The edge serving module 212 can expose the API Gateway for /api/predict/ for predictions, and receive a binary stream using an edge URL or endpoint of the edge device 114a. The edge serving module 212 can also use the edge layer prediction 176 to look up actions 148 to perform from a decision hash table. The edge layer prediction 176 can be a key and the actions 148 as the value of a key value pair of the decision hash table. The edge serving module 212 can transmit action commands 239 to the client device 106, the IoT device 112, or another device.

The edge consulting module 215 can communicate between the edge and the cloud. The edge consulting module 215 can be deployed at the edge layer and can monitor the edge layer predictions 176 of the edge serving module 212. The edge consulting module 215 can decide whether to proceed based on the edge layer prediction 176 made by the edge device 114a using the quantized decision model 175, or if a cloud layer prediction request 234 should be transmitted to the cloud decision manager 160. The cloud layer prediction request 234 can identify the decision model 144 or quantized decision model 175, as well as the device layer data 154 on which the edge layer prediction 176 was made. The edge consulting module 215 can also schedule and execute background process to adjust or correct edge layer predictions 176 with cloud layer predictions 146 when the cloud computing environment 103 is accessible to the edge device 114a.

The cloud layer can include the cloud computing environment 103, cloud decision manager 160, and decision models 144 as discussed in FIG. 1. The cloud decision manager 160 can include a cloud consulting module 221 and a cloud serving module 224. The cloud consulting module 221 can generally correlate a cloud layer prediction request 234 to a corresponding decision model 144 and return a cloud layer prediction 146 based on the decision model 144. The cloud serving module 224 can maintain a log of prediction events including the cloud layer predictions 146 and edge layer predictions 176. The cloud serving module 224 can also transmit a task 231 to the edge decision manager 172. The task 231 can include a task profile 149, a quantized decision model 175, actions 148, and other information. The edge decision manager 172 can maintain a log of edge layer predictions 176, for example, if network connectivity is unavailable. The edge decision manager 172 can transmit the edge layer predictions 176 to the cloud decision manager 160.

Figure 3:
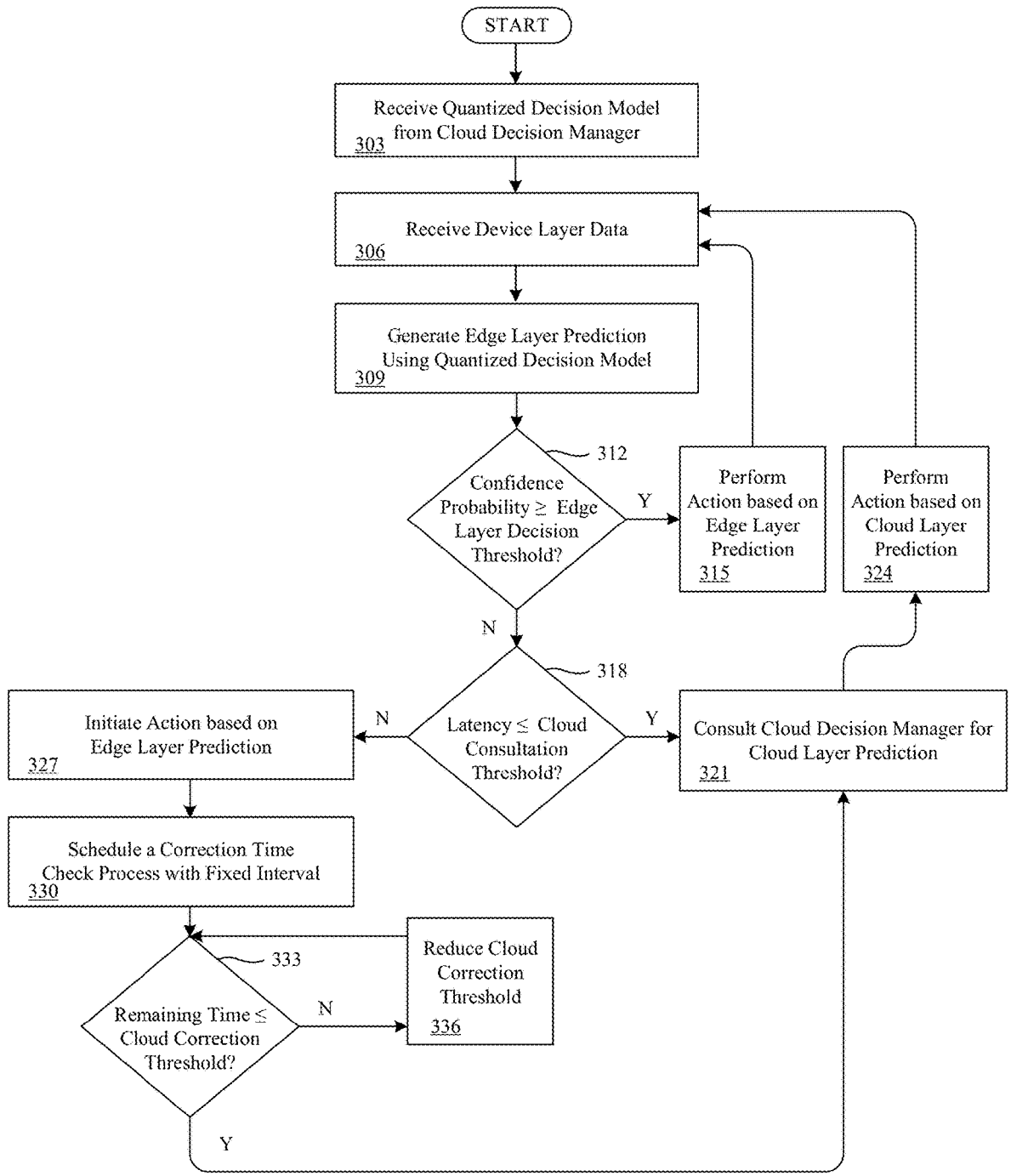
FIG. 3 is a flowchart illustrating functionality implemented by components of the networked computing environment of FIG. 1 for a hybrid quantized decision model framework.

While the flowchart of FIG. 3 can generally be viewed as depicting an example of elements of a method implemented by the edge decision manager 172 executing in the edge device 114, additional functionality is performed by other components of the networked environment 100. The separation or segmentation of functionality as discussed herein is presented for illustrative purposes only.

In step 303, the edge decision manager 172 can receive a quantized decision model 175 from a cloud decision manager 160. In some cases, the edge decision manager 172 can receive a task profile 149 that specifies a unique identifier of the quantized decision model 175 and a URL or other network endpoint to request and download the quantized decision model 175. The edge decision manager 172 can request and download the quantized decision model 175 based on its unique identifier and the network endpoint. The quantized decision model 175 can include a quantized version of a decision model 144 that remains on the cloud computing environment 103 for higher-resolution cloud layer predictions 146. The received task profile 149 can specify a unique quantized model identifier for a quantized decision model 175, a logical group of edge devices 114, and an edge layer decision threshold, a cloud consultation threshold time, and a cloud correction threshold time.

In step 306, the edge decision manager 172 can receive device layer data 154. The device layer data 154 can include image data, audio data, video data, states, measurements, sensor values, and other information for IoT devices 112 and client devices 106. The edge decision manager 172 can expose an API gateway or a network endpoint for predictions. The client devices 106 and IoT devices 112 can provide device layer data 154 as a binary stream or another structure.

In step 309, the edge decision manager 172 can generate an edge layer prediction 176 using the quantized decision model 175. For example, the edge decision manager 172 can provide the device layer data 154 as one or more inputs into the quantized decision model 175. The quantized decision model 175 can include a machine learning model, deep learning model, statistical model, or other type of nondeterministic model. The quantized decision model 175 can be a model that has been trained, for example, using real world inputs and known results, to make edge layer predictions 176 when device layer data 154 is provided as an input.

In step 312, the edge decision manager 172 can determine whether a confidence probability for the edge layer prediction 176 is greater than (or equal to) an edge layer decision threshold. The edge layer decision threshold can refer to a minimum prediction confidence in percentage to delegate decision-making to the edge device 114, such that the edge device 114 can utilize the quantized decision model 175 without consulting the cloud decision manager 160 and the higher-confidence version or decision model 144. The confidence probability can be provided based on the quantized decision model 175 used to generate the edge layer prediction 176. The confidence probability can be provided as an output of the quantized decision model 175 along with the edge layer prediction 176. Alternatively, the confidence probability can be empirically determined based on a set of results of the quantized decision model 175. If the confidence probability for the edge layer prediction 176 is greater than (or equal to) an edge layer decision threshold, the process can move to step 315. Otherwise, if the confidence probability for the edge layer prediction 176 is less than (or equal to) an edge layer decision threshold, the process can move to step 318.

In step 315, the edge decision manager 172 can perform an action 148 based on the edge layer prediction 176. In other words, the edge decision manager 172 can perform an action 148 without consulting the cloud decision manager 160, because the confidence probability indicates a sufficient confidence score or percentage indicated in the edge layer decision threshold. The edge layer decision threshold can be a predetermined threshold accuracy, precision, or another measure of confidence.

The edge decision manager 172 can identify the action 148 based on a decision hash table, for example, by providing the edge layer prediction 176 as a key. In order to complete the action 148, the edge decision manager 172 can transmit an action command 239 to a client device 106 or an IoT device 112. The action 148 can include a request to change a state, setting, hardware configuration, or software configuration of the target device. Multiple actions can be identified and performed based on a single edge layer prediction 176. The action 148 can also cause the edge decision manager 172 to change its own states, settings, hardware configuration, and software configuration.

In step 318, the edge decision manager 172 can determine whether a current latency is less than (or equal to) a cloud consultation threshold. The current latency can refer to a round-trip latency between the edge device 114 and the cloud computing environment 103. The edge decision manager 172 can identify the current latency from a network status hash table stored in the edge device 114. The network status hash table can include two sub fields indicating accessibility of the cloud computing environment 103, and a current edge-cloud round trip latency in seconds. The cloud consultation threshold can refer to a maximum latency that the quantized decision model 175 can wait for a cloud layer prediction from the cloud decision manager 160. If the current latency is less than (or equal to) the cloud consultation threshold time, then the process can move to step 321. Alternatively, if the current latency is greater than (or equal to) the cloud consultation threshold time, then the process can move to step 327.

In some examples, no cloud consultation threshold is specified or known. For example, a bandwidth-sensitive task profile 149 can specify a unique quantized model identifier, a logical group of edge devices 114, and an edge layer decision threshold, without further latency or connectivity thresholds. If no cloud consultation threshold is specified or known, then the process can move to step 321 to consult the cloud decision manager 160. In other words, for a bandwidth-sensitive task profile 149, the edge decision manager 172 can analyze device layer data until an edge layer prediction 176 such as a positive identification of a predicted outcome is made. However, this can be a false positive, particularly if the confidence probability is too low. As a result, the edge decision manager 172 can move to step 321 and consult the cloud decision manager 160.

In step 321, the edge decision manager 172 can consult the cloud decision manager 160 for a cloud layer prediction 146. For example, the edge decision manager 172 can transmit a request for a cloud layer prediction 146. The request can include the device layer data 154 used by the edge decision manager 172 to positively identify the edge layer prediction 176 using the quantized decision model 175. This can reduce Internet or WAN network bandwidth because the device layer data 154 is not transmitted to the cloud computing environment 103 until an edge layer prediction 176 is identified using the quantized decision model 175. In response to the request, the cloud decision manager 160 can input the device layer data 154 to the decision model 144 and return a cloud layer prediction 146.

In step 324, the edge decision manager 172 can perform an action 148 based on the cloud layer prediction 146. For example, the decision model 144 can positively identify and return a cloud layer prediction 146 that is the same as the edge layer prediction 176. In other words, the cloud layer prediction 146 can verify the edge layer prediction 176. The decision model 144 can also positively identify and return a different prediction in the cloud layer prediction 146, which can be used to correct the edge layer prediction 176. The decision model 144 can also fail to positively identify a prediction, so the cloud layer prediction 146 can be considered a negative prediction to correct the edge layer prediction 176. The edge decision manager 172 can identify the action 148 based on a decision hash table, for example, by providing the cloud layer prediction 146 as a key, rather than the edge layer prediction 176. However, where the cloud layer prediction 146 includes a negative prediction to correct the edge layer prediction 176, then no action 148 is performed.

In step 327, if the current latency is greater than (or equal to) the cloud consultation threshold time, the edge decision manager 172 can initiate an action 148 based on the edge layer prediction 176. However, in this case the confidence of the edge layer prediction 176 is lower than the predetermined edge layer decision threshold.

In step 330, the edge decision manager 172 can schedule a correction time check process. The correction time check process can include an application or program instructions to check whether there is enough time to both consult the cloud decision manager 160 and correct, rather than verify, the edge layer prediction 176.

In step 333, the edge decision manager 172 can determine whether a current remaining time is less than (or equal to) a cloud correction threshold. The current remaining time can refer to a current amount of time (round trip latency) to contact the cloud decision manager 160 and also correct the edge layer prediction 176. The cloud correction threshold can be a maximum latency that the edge decision manager 172 can wait before implementation of an action 148 that was initiated, for example, in step 327. This can include predicted or actual time prior to completion of the action 148 using the IoT device 112, the client device 106, or the edge device 114. This can also include a user-entered time to wait prior to implementing the initiated action 148. If the current remaining time is less than (or equal to) the cloud correction threshold, then the edge decision manager 172 can proceed to step 321 to consult the cloud decision manager 160. Otherwise, if the current remaining time is greater than (or equal to) the cloud correction threshold, then the edge decision manager 172 can move to step 336

In step 336, the edge decision manager 172 can temporarily reduce the cloud correction threshold. For example, since the cloud correction threshold refers to a time period that the edge decision manager 172 can afford to wait before moving forward with the edge layer prediction 176, as time elapses this threshold amount of time should be temporarily reduced. In other words, the cloud correction threshold for the current action 148 can be reduced, but it can remain the same for future actions 148 for new predictions. The process can then move back to step 333. This reduction of time can be performed until the cloud correction threshold time has elapsed.

Figure 4:
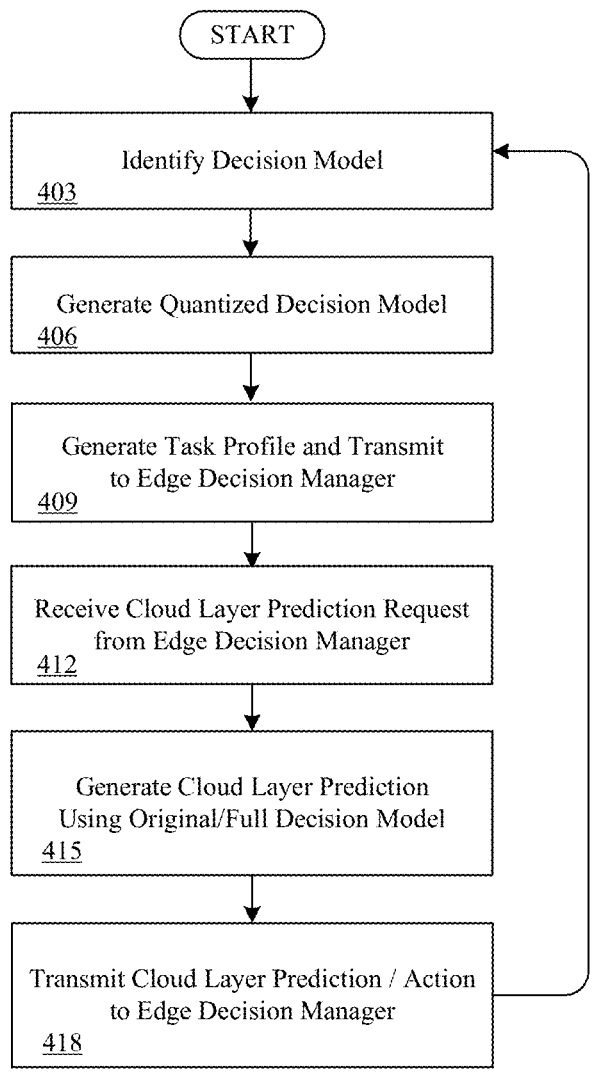
FIG. 4 is another flowchart illustrating functionality implemented by components of the networked computing environment of FIG. 1 for a hybrid quantized decision model framework.

Moving to FIG. 4, a flowchart is shown that provides one example of the operation of a portion of the networked environment 100. While the flowchart of FIG. 4 can generally be viewed as depicting an example of elements of a method implemented by the cloud decision manager 160 executing in the cloud computing environment 103, additional functionality is performed by other components of the networked environment 100. The separation or segmentation of functionality as discussed herein is presented for illustrative purposes only.

In step 403, the cloud decision manager 160 can identify a decision model 144. The decision model 144 can include a machine learning model, deep learning model, statistical model, or other type of nondeterministic model. The decision model 144 can be a model that has been trained, for example, using real world inputs and known results, to make edge layer predictions 176 when device layer data 154 is provided as an input.

In step 406, the cloud decision manager 160 can generate a quantized decision model 175. The quantized decision model 175 can be a quantized version of the decision model 144. The cloud decision manager 160 can quantize or reduce complexity of the decision model 144.

In step 409, the cloud decision manager 160 can transmit a task profile 149 to the edge decision manager 172 or agent application 169. The cloud decision manager 160 can provide a console user interface through which an administrator or another user can specify various aspects of a task profile 149. For example, the user interface can include a user interface element through which specifications for the task profile 149 can be user-entered or user-selected. The specifications of the task profile 149 can include a unique quantized model identifier for a quantized decision model 175, a logical group of edge devices 114, and an edge layer decision threshold, a cloud consultation threshold time, and a cloud correction threshold time. The cloud decision manager 160 can generate the task profile 149 based on the user-entered specifications and can transmit a task profile 149 to the edge device 114.

In step 412, the cloud decision manager 160 can receive a cloud layer prediction request 234 from the edge decision manager 172. The cloud layer prediction request 234 can identify the decision model 144 or quantized decision model 175, as well as the device layer data 154 on which the edge layer prediction was made.

In step 415, the cloud decision manager 160 can generate a cloud layer prediction 146. The cloud decision manager 160 can identify a decision model 144. For example, the cloud decision manager 160 can identify the decision model 144 or the quantized decision model 175 from the cloud layer prediction request 234. If the cloud layer prediction request 234 includes a unique identifier of the quantized decision model 175, the cloud decision manager 160 can identify the corresponding decision model 144 from which the quantized decision model 175 was derived or generated. The cloud decision manager 160 can input the device layer data 154 to the decision model 144 to generate a cloud layer prediction 146.

In step 418, the cloud decision manager 160 can transmit the cloud layer prediction 146 to the edge decision manager 172 of the edge device 114. The decision model 144 can positively identify the same prediction as the edge layer prediction 176, and the cloud decision manager 160 can transmit a cloud layer prediction 146 that verifies the edge layer prediction 176. The decision model 144 can also positively identify and return a different cloud layer prediction 146 from the edge layer prediction 176. In other cases, the decision model 144 can fail to positively identify a prediction, and the cloud decision manager 160 can transmit a cloud layer prediction 146 with a negative prediction result that corrects the edge layer prediction 176.

Stored in the memory device are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the cloud computing environment 103. These client devices 106 can include a display upon which a user interface generated by a client application for providing a virtual desktop session (or other session) can be rendered. In some examples, the user interface can be generated using user interface data provided by the cloud computing environment 103. The client device 106 can also include one or more input/output devices that can include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application.

Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device; and
   program instructions stored in at least one memory of the at least one computing device, wherein the instructions, when executed by at least one processor, cause the at least one computing device to at least:
      identify, by a cloud computing environment executing a cloud decision manager, a cloud layer decision model that generates cloud layer predictions based on device layer data for at least one device;
      generate, by the cloud computing environment, a quantized decision model that is a quantized version of the cloud layer decision model, the quantized decision model comprising a decreased computational requirement relative to the cloud layer decision model;
      identify, by the cloud computing environment, a logical group of at least one edge device that collects the device layer data from the at least one device; and
      transmit, by the cloud computing environment, the quantized decision model to the at least one edge device along with a task profile that specifies a round-trip network latency threshold that causes the at least one edge device to identify a current edge-cloud round-trip network latency and use the quantized decision model in an instance in which the current edge-cloud round-trip network latency is greater than the round-trip network latency threshold.

2. The system of claim 1, wherein the instructions, when executed by the at least one processor, cause the at least one computing device to at least:
   generate, by the cloud computing environment, the task profile comprising a unique identifier of the quantized decision model, the logical group of the at least one edge device, and an edge layer decision threshold that indicates a prediction confidence for an edge device to utilize the quantized decision model without consulting the cloud decision manager.

3. The system of claim 1, wherein the instructions, when executed by the at least one processor, cause the at least one computing device to at least:
   receive, by the cloud computing environment, a cloud layer prediction request from an edge device of the at least one edge device, the cloud layer prediction request specifying: the device layer data, and at least one of: the cloud layer decision model, or the quantized decision model; and
   transmit, by the cloud computing environment, a cloud layer prediction generated based on the cloud layer decision model.

4. The system of claim 3, wherein the cloud layer prediction request further specifies an identification of the edge device.

5. The system of claim 3, wherein the cloud layer prediction further specifies an action.

6. The system of claim 3, wherein the cloud layer prediction is transmitted as a verification of an edge layer prediction generated by the edge device using the quantized decision model.

7. The system of claim 3, wherein the cloud layer prediction is transmitted as a correction of an edge layer prediction generated by the edge device using the quantized decision model.

8. A method, comprising:
   identifying, by a cloud computing environment executing a cloud decision manager, a cloud layer decision model that generates cloud layer predictions based on device layer data for at least one device;
   generating, by the cloud computing environment, a quantized decision model that is a quantized version of the cloud layer decision model, the quantized decision model comprising a decreased computational requirement relative to the cloud layer decision model;
   identifying, by the cloud computing environment, a logical group of at least one edge device that collects the device layer data from the at least one device; and
   transmitting, by the cloud computing environment, the quantized decision model to the at least one edge device along with a task profile that specifies a round-trip network latency threshold that causes the at least one edge device to identify a current edge-cloud round-trip network latency and use the quantized decision model in an instance in which the current edge-cloud round-trip network latency is greater than the round-trip network latency threshold.

9. The method of claim 8, further comprising:
   generating, by the cloud computing environment, the task profile comprising a unique identifier of the quantized decision model, the logical group of the at least one edge device, and an edge layer decision threshold that indicates a prediction confidence for an edge device to utilize the quantized decision model without consulting the cloud decision manager.

10. The method of claim 8, further comprising:
   receiving, by the cloud computing environment, a cloud layer prediction request from an edge device of the at least one edge device, the cloud layer prediction request specifying: the device layer data, and at least one of: the cloud layer decision model, or the quantized decision model; and
   transmitting, by the cloud computing environment, a cloud layer prediction generated based on the cloud layer decision model.

11. The method of claim 10, wherein the cloud layer prediction request further specifies an identification of the edge device.

12. The method of claim 10, wherein the cloud layer prediction further specifies an action.

13. The method of claim 10, wherein the cloud layer prediction is transmitted as a verification of an edge layer prediction generated by the edge device using the quantized decision model.

14. The method of claim 10, wherein the cloud layer prediction is transmitted as a correction of an edge layer prediction generated by the edge device using the quantized decision model.

15. A non-transitory computer-readable medium comprising program instructions that when executed by at least one processor, cause at least one computing device to at least:
   identify, by a cloud computing environment executing a cloud decision manager, a cloud layer decision model that generates cloud layer predictions based on device layer data for at least one device;
   generate, by the cloud computing environment, a quantized decision model that is a quantized version of the cloud layer decision model, the quantized decision model comprising a decreased computational requirement relative to the cloud layer decision model;
   identify, by the cloud computing environment, a logical group of at least one edge device that collects the device layer data from the at least one device; and
   transmit, by the cloud computing environment, the quantized decision model to the at least one edge device along with a task profile that specifies a round-trip network latency threshold that causes the at least one edge device to identify a current edge-cloud round-trip network latency and use the quantized decision model in an instance in which the current edge-cloud round-trip network latency is greater than the round-trip network latency threshold.

16. The non-transitory computer-readable medium of claim 15, wherein the instructions, when executed by the at least one processor, cause the at least one computing device to at least:
   generate, by the cloud computing environment, the task profile comprising a unique identifier of the quantized decision model, the logical group of the at least one edge device, and an edge layer decision threshold that indicates a prediction confidence for an edge device to utilize the quantized decision model without consulting the cloud decision manager.

17. The non-transitory computer-readable medium of claim 15, wherein the instructions, when executed by the at least one processor, cause the at least one computing device to at least:
   receive, by the cloud computing environment, a cloud layer prediction request from an edge device of the at least one edge device, the cloud layer prediction request specifying: the device layer data, and at least one of: the cloud layer decision model, or the quantized decision model; and
   transmit, by the cloud computing environment, a cloud layer prediction generated based on the cloud layer decision model.

18. The non-transitory computer-readable medium of claim 17, wherein the cloud layer prediction further specifies an action.

19. The non-transitory computer-readable medium of claim 17, wherein the cloud layer prediction is transmitted as a verification of an edge layer prediction generated by the edge device using the quantized decision model.

20. The non-transitory computer-readable medium of claim 17, wherein the cloud layer prediction is transmitted as a correction or a verification of an edge layer prediction generated by the edge device using the quantized decision model.

* * * * *